Figure 1:
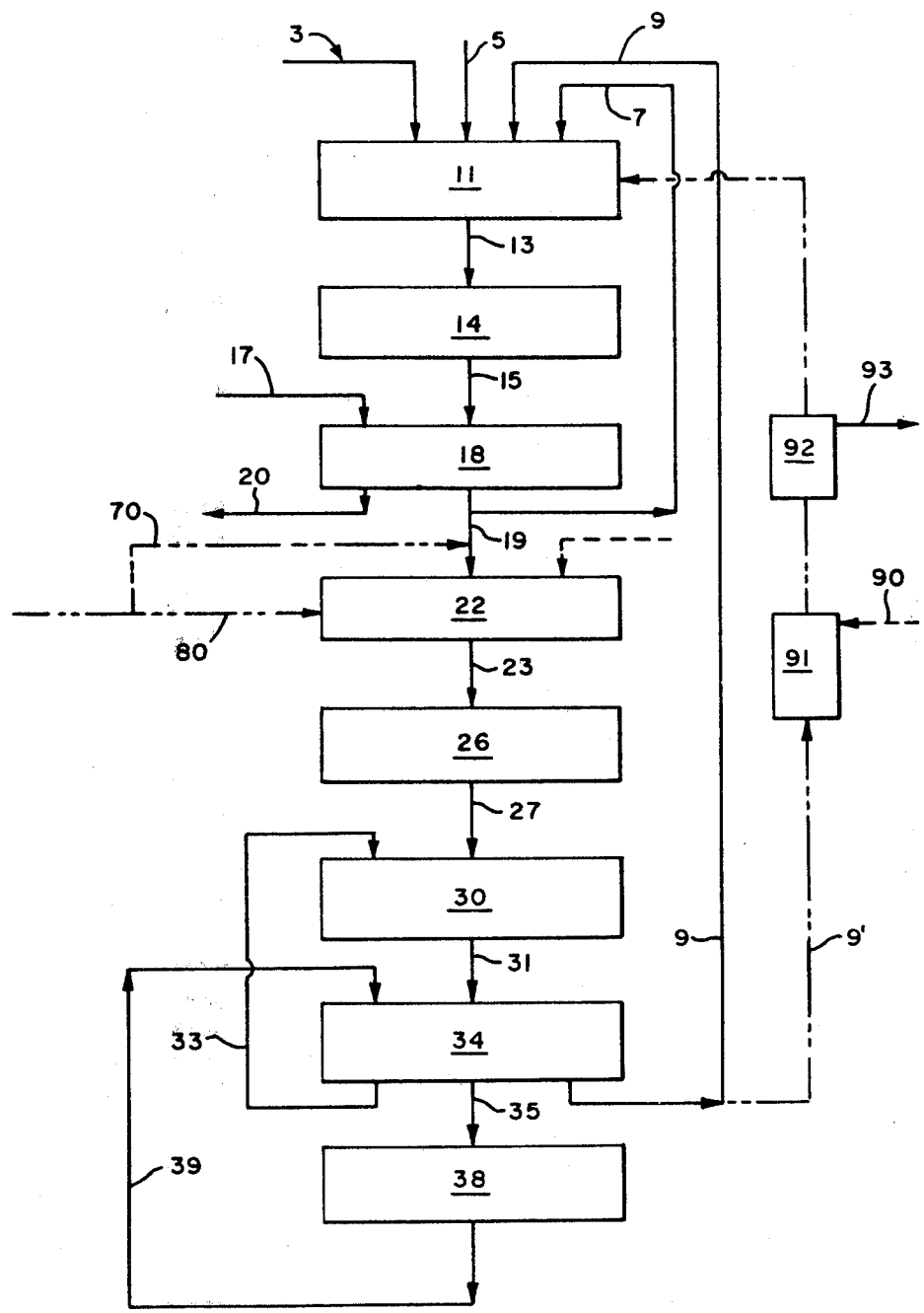

United States Patent [19]

Roberts

[11] 4,331,507

[45] May 25, 1982

[54] DESILICATION IN ALKALINE PULP PROCESSES

[75] Inventor: Elliot J. Roberts, Westport, Conn.

[73] Assignee: Dorr-Oliver Incorporated, Stamford, Conn.

[21] Appl. No.: 212,700

[22] Filed: Dec. 3, 1980

Related U.S. Application Data

[63] Continuation-in-part of Ser. No. 101,468, Dec. 10, 1979, abandoned.

[51] Int. Cl.³ .................. D21C 11/04; D21C 11/10
[52] U.S. Cl. .................................. 162/29; 162/48
[58] Field of Search ............ 162/29, 30 R, 30 K, 162/32, 36, 48; 423/DIG. 3

[56] References Cited

U.S. PATENT DOCUMENTS

| | | | |
|---|---|---|---|
| 1,410,642 | 3/1922 | Bassett | 423/121 |
| 1,906,088 | 4/1933 | Parsons | 162/97 |
| 2,519,362 | 8/1950 | Flint et al. | 423/121 |
| 2,898,994 | 8/1959 | Thomsen | 162/24 |
| 2,992,893 | 7/1961 | Soudan et al. | 423/121 |
| 3,061,408 | 10/1962 | Lurie | 162/36 |
| 3,147,178 | 9/1964 | Sowa | 162/13 |
| 3,657,065 | 4/1972 | Smith et al. | 162/65 |
| 4,154,643 | 5/1979 | Cook et al. | 162/30 R |

FOREIGN PATENT DOCUMENTS

381697 10/1932 United Kingdom ............... 162/29

OTHER PUBLICATIONS

Casey, Pulp and Paper Chemistry and Chemical Technology, Second Edition, 1960, Interscience Publishers Inc, New York, vol. 1, pp. 272-277 and 442.
Miller, "Filtration of Kraft Cooking Liquor ... "; Paper Trade Journal; vol. 139, No. 19; May 9, 1955; pp. 96-97.
Chemical Abstracts, vol. 68, 1968, p. 8536, items 88335a and 88336b.
Clifford et al., "Activated Alumina: Rediscovered Adsorbent ... ", Industrial Water Engineering, Dec. 1978, 5 pages.

*Primary Examiner*—Richard V. Fisher
*Attorney, Agent, or Firm*—Burtsell J. Kearns; Harold M. Snyder

[57] ABSTRACT

In the alkaline digestion of silica-contaminated paper pulp raw material, an addition of aluminum oxide in the form of bauxite ore is made to the liquor, the aluminum oxide being present in the bauxite as a hydrated oxide such as $Al_2O_3 \cdot H_2O$ or $Al_2O_3 \cdot 3H_2O$, to insolubilize silica as a sodalite precipitate, and thereby minimize scaling evaporation, avoid undesirable increase in the viscosity of the liquor, as well as assuring recovery of lime by avoiding formation of calcium silicate during causticizing.

4 Claims, 3 Drawing Figures

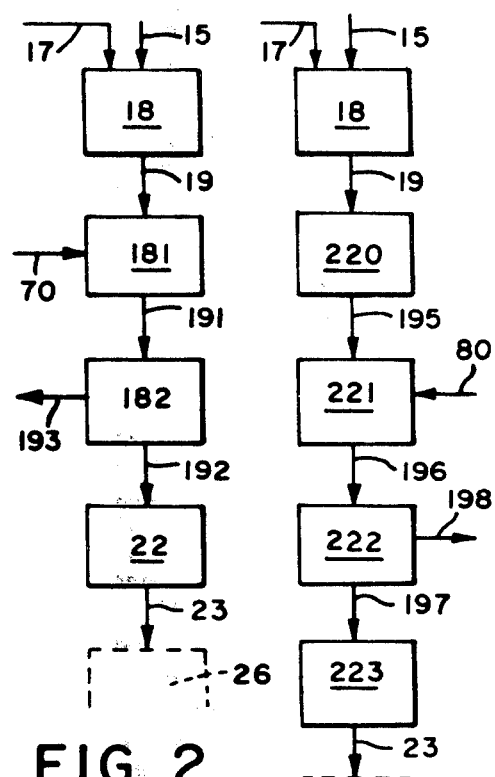

DESILICATION IN ALKALINE PULP PROCESSES

This is a continuation-in-part of Application Ser. No. 101,468, filed Dec. 10, 1979, now abandoned.

This invention relates to alkaline-type pulping processes for the manufacture of pulp; that is, the soda and sulfate processes, particularly where the raw materials used are contaminated with soluble silica.

The alkaline-type wood and non-wood pulping processes are well known and involve the digestive treatment of the cellulosic fiber material in cooking liquors which contain caustic soda alone or with substantial quantities of sodium sulfide as the principal delignifying constituents of the liquors, the digestive treatment usually being carried out under elevated temperature and pressure conditions. In general, the soda process, employing sodium hydroxide alone, is adequate for the softer non-woods and other cellulosic fibrous materials, and the sulfate process, in which both sodium hydroxide and sodium sulfide are employed, is suitable for woods such as pine, oak or eucalyptus and for dense non-woods such as bamboo.

In broad outline, the alkaline processes call for cooking the cellulosic fiber material in an alkaline cooking liquor at elevated temperature and pressure, separating the black liquor generated by the cooking process from the pulp in brownstock washers, forwarding the washed pulp for further processing, and routing the black liquor into a recovery processing system in which the black liquor is first concentrated in multi-effect evaporators and the concentrated liquor directed into a furnace in which the organic material is burned, leaving sodium salts including sodium carbonate. The sodium salts from the furnace are dissolved in wash liquors containing dilute cooking liquor, forming the so-called green liquor, the green liquor is reacted with lime in the causticizing step, producing sodium hydroxide which can be recycled in the process and calcium carbonate which is calcined to produce lime for recycling in the process.

Some raw materials used in the alkaline processes such as bamboo, bagasse (waste sugar cane stalks from which the juice has been extracted), wheat and rice straw and wood bark, carry contaminating soluble silica into the process. Soluble silica which reaches the digester tends to dissolve in the black liquor and increases the black liquor viscosity. In the multi-effect evaporators, siliceous scale deposits on the internal surfaces thereby reducing the effectiveness of the units, and in the causticizing step, calcium silicate is formed, retained and recirculated in the lime recovery process. This burden of calcium silicate in the recovery process must ultimately be relieved by withdrawing this inert constituent from the process. The calcium silicate cannot be calcined to form lime and therefore a substantial amount of the contaminated lime must be removed from the cycle, and lime required for the process must be purchased fresh lime.

The silica which causes the difficulty in the paper pulp processes is the soluble silica, not silica in the insoluble form; i.e., sand or quartz. The soluble silica is the silica absorbed by the plant in its growth and is sometimes found in localized concentration in the plant, for example, in the nodes of the bamboo plant.

It has been reported in the literature that $CO_2$, $MgSO_4$ or $Al_2(SO_4)_3$ have been used to effect desilication of bamboo kraft pulp black liquor (Chem. Abstracts, 1968, Vol. 68, Page 8536). $Al_2(SO_4)_3$ is regarded in the reported work as superior to $MgSO_4$ or $CO_2$ in the desilication application, but the recovery and reuse of the $Al_2(SO_4)_3$ is recognized as essential from the viewpoint of economics. As a matter of fact, $Al_2(SO_4)_3$ is initially so expensive as to render desilication by this means impractical and, further, the essential recovery of the compound for reuse involves processing which is both capital and energy cost intensive.

In British Specification No. 381,697, accepted Oct. 13, 1932, there is disclosed a "Method of Relieving Alkaline Waste Liquors from the Soda or Sulphate Pulp Manufacture, of Silica". This method involves "adding to the digester liquor used, before or during the digestion, one or several oxides or hydroxides of such metals the silicates of which are insoluble in the water liquor formed during digestion, such as aluminum, calcium, zinc, magnesium, and so forth, in a sufficient quantity and in such manner that the oxide, or oxides, or hydroxide, or hydroxides, added become intimately mixed with the digester liquor". The silicate precipitates on the cellulosic fibre which acts as an absorption agent. The British specification also suggests that an aluminate addition may be made in the state of bauxite, "provided the colour of the same does not stand in the way of the intended use of the cellulose". The present invention presents methods whereby addition of bauxite, the only practical and economical way to provide the required aluminum oxide for reaction, may be employed for desilication of pulp liquor despite the colorant ($Fe_2O_3$) present in the bauxite.

It is clear that a need exists for a process which is capable of removing soluble silica before its deleterious effects on the process occur.

It is accordingly an object of the invention to provide a method in the alkaline-type pulping processes for removing silica at an early stage in the processing.

It is an object of the invention to provide an improved alkaline pulping process in the manufacture of pulp which can utilize silica-contaminated raw materials.

It is still another object of the invention to provide a relatively simple and economical method for removing soluble silica in an alkaline-type pulping process for pulp manufacture.

Other objects and advantages of the invention will become apparent from the following description taken in conjunction with the accompanying drawings in which:

FIG. 1 is a flow diagram showing an alkaline-type pulping process to which the invention may be applied, FIG. 2 is a modification of a portion of the flow diagram of FIG. 1 showing another embodiment of the invention, and FIG. 3 is a modified form of a portion of the flow diagram of FIG. 1 showing still another embodiment of the invention.

The following definitions of terms used in the pulp and paper industries will be employed in the description set forth hereafter:

Black Liquor—liquor comprising organics resulting from the digestion of raw cellulosic plant material together with residual caustic, $Na_2CO_3$ and NaHS.

Green Liquor—liquor comprising dissolved $Na_2CO_3$; the $Na_2CO_3$ being a product (smelt or pellets) of the combustion of black liquor.

White or Cooking Liquor—Liquor containing NaOH obtained by reacting the green liquor with lime (CaO) in accordance with the following equation:

$$Na_2CO_3 + CaO + H_2O \rightarrow 2NaOH + CaCO_3 \downarrow.$$

Pulp Liquor—white (cooking) liquor or spent black liquor.

Generally speaking, the present invention is directed to an improvement in alkaline-type pulping processes for the manufacture of pulp from silica-contaminated raw materials wherein a quantity of aluminum oxide, and particularly, bauxite ore (which consists of hydrated aluminum oxides and impurities), sufficient to react with the silica and sodium hydroxide present in the process is introduced into the pulp liquor to precipitate the silica as a sodalite. Hydrated aluminum oxides are readily soluble in the NaOH present and comprise the monohydrate, $Al_2O_3.H_2O$ (diaspore), or the trihydrate, $Al_2O_3.3H_2O$ (gibbsite), the latter being stoichiometrically equivalent to $2Al(OH)_3$. For the sake of clarity, the term "aluminum oxide" is used herein to designate the hydrated aluminum oxide compounds.

Bauxite ore (hydrated aluminum oxide) may be added to the white liquor to produce the intermediate oxide compound $Na_2O.Al_2O_3$, which is soluble in NaOH and will precipitate the silica as a sodalite.

More specifically, it has been found that there are several points in the pulping process at which the bauxite addition may be made, as follows:

(a) bauxite may be added directly to the black liquor either prior to the evaporators or at an intermediate stage of evaporation.

(b) bauxite may be dissolved in the white liquor; the white liquor, with the sodium aluminate thus formed, then being added to the digester.

It will be understood that sodalite precipitation ordinarily commences at the point of introduction of the bauxite.

In carrying out the invention, it is preferred that the aluminum oxide contained in the bauxite ore be in the form of the trihydrate ($Al_2O_3.3H_2O$), for the reason that, although the monohydrate ($Al_2O_3.H_2O$) will perform the desired function, the latter, in general, is less readily soluble.

Bauxite ore provides an inexpensive source for the aluminum oxide. As it occurs in nature, bauxite is sometimes a mixture of the tri and mono hydrate and has been designated as $Al_2O_3.2H_2O$ by some authors. In this light, bauxite containing $Al_2O_3.2H_2O$ would also come within the scope of the invention.

As indicated previously, the removal of soluble silica is effected by precipitation of the silica as a sodalite by the addition of bauxite (aluminum oxide). The following exemplary equation illustrates this reaction:

$$3SiO_2 + 4NaOH + 3Al(OH)_3 \rightarrow Na_4Al_3(SiO_4)_3OH \cdot 2.4H_2O \downarrow + 3.6H_2O.$$

The exact formula of the sodalite may vary depending upon the chemistry of the raw materials used in the process and other factors. For example, the OH may be replaced in part by $\frac{1}{2}CO_3$ and the degree of hydration may not exactly conform to $2.4H_2O$.

Turning to FIG. 1, which depicts a conventional soda or sulfate process flow diagram with certain additions, it is seen that the digester 11 is supplied with a feed of wood chips or other cellulosic fiber through line 3, black liquor is supplied through line 7 and white liquor is supplied to the digester through line 9, while steam to heat and pressurize the digester is supplied through line 5. The cooking liquor in digester 11 dissolves most of the lignin from the wood, with relatively slight effect on cellulose, thus leaving the latter in a form suitable for subsequent conversion into paper. The active constituents of the cooking liquor in the sulfate process are sodium hydroxide and sodium sulfide. The digester is preferably operated at a temperature in the range from 165° C. to 177° C. (roughly 330° to 350° F.) and preferably at a pressure in the range from 100 to 150 psi. The black liquor and pulp product of the digester 11, still under pressure, is discharged into blow tank 14 through line 13 thereby reducing the pressure to essentially ambient pressure. The liquor and pulp from the blow tank must be separated to remove spent chemicals for subsequent recovery. In the brownstock washers 18, to which the pulp and black liquor have been conveyed through line 15, this separation is carried out with the washed pulp removed through line 20 for further processing, for example, to a screen room, and/or bleach plant or paper mill. Water is introduced by means of conduit 17 into the brownstock washers 18 to carry out the washing procedure and a dilute black liquor stream is removed through line 19 to the recovery system of the process. In the recovery system the stages employed are:

(a) concentration of black liquor;
(b) combustion of concentrated black liquor;
(c) dissolving the combustion solid products in weak wash liquors;
(d) causticizing the dissolved product with lime to produce cooking liquor;
(e) calcining the lime mud for reuse in causticizing.

In the multi-effect evaporators 22 enough water is removed from the black liquor stream introduced through line 19 to enable it to be burned efficiently. The concentrated black liquor, which is the product of the multi-effect evaporators 22 and which is forwarded to the recovery furnace 26 through line 23, contains organic matter in solution and sodium compounds. The concentrated liquor will burn autogenously in the furnace. After the combustion stage, which is carried out in the recovery furnace 26, there remains a residue of sodium carbonate, unburned carbon and incombustible inorganic matter from the wood or other cellulosic fibrous material. This product of the recovery furnace, which may be a "black ash", smelt or pellets, is forwarded to the dissolving tank 30 through line 27. In the dissolving tank, the smelt or other product of the recovery furnace is dissolved in weak wash liquor introduced through line 33 from lime mud washing, a subsequent stage in the process, thereby providing a solution primarily comprising sodium carbonate. The causticizing process consists in converting the sodium carbonate from the dissolved smelt into caustic soda (sodium hydroxide) by treatment with lime, the reactions being as follows:

$$CaO + H_2O \rightarrow Ca(OH)_2$$

$$Ca(OH)_2 + Na_2CO_3 \rightarrow CaCO_3 \downarrow + 2NaOH.$$

Thus, in the causticizing system 34 the green liquor directed thereto through line 31 is treated to produce NaOH, which is then returned to the digester as white liquor through line 9. The lime mud from the causticizing system 34 is directed as indicated by line 35 to a calciner 38 for lime reburning. In the calciner, the calcium carbonate is heated to an elevated temperature, carbon dioxide is driven off and the reburned lime (CaO) is recycled through line 39 to the causticizing system.

A system of the type just described has been successfully installed in many different locations around the world. A problem does arise, however, when the raw materials are contaminated with soluble silica. Such contamination is observed principally in locations where materials such as bagasse, wheat and rice straw, esparto grass and bamboo are employed in pulp manufacture due to the shortage or absence of pulping grade wood.

Once in the process, the silica is dissolved in the initial stages of treatment and is transported with the black liquor, into the evaporation stage and with the smelt and green liquor into the causticizing system. As indicated previously, the silica increases the viscosity of the black liquor, results in scale formation in the evaporators and in a loss of lime in the causticizing system.

In accordance with this invention, the introduction of bauxite (aluminum oxide) into the pulp liquor will precipitate the silica as a sodalite. The sodalite precipitate can be removed from the black liquor by settling and filtration. Thus, in the FIG. 1 process, the objective is to contact the silica-bearing liquor with the bauxite. One alternative is to add the bauxite (aluminum oxide) to the white liquor flowing in line 9' (substituted for line 9) from the causticizing system to the digester 11. A reaction-dissolving stage 91 is provided in which the bauxite supplied through line 90 is mixed with the white liquor supplied through line 9' and this is followed by a separation stage 92 to remove impurities such as $Fe_2O_3$.

In FIG. 2 another alternative for introduction of bauxite into the process is illustrated. In this case, a reactor 181 and a separator 182 are inserted between the brownstock washers 18 and the evaporators 22. Dilute black liquor from the brownstock washers 18 is directed into reactor 181 through line 19. Bauxite is routed into reactor 181 through line 70. In reactor 181 the aluminum oxide of the bauxite reacts with the dilute black liquor and the silica is precipitated as a sodalite. The contents of reactor 181 are directed into separator 182 through line 191 and the black liquor is separated therein from the sodalite precipitate; the separated sodalite being removed from the process stream through line 193 and the black liquor being advanced to the next stage of the process, the evaporators 22 and, thereafter, to the recovery furnace 26 through line 23.

In FIG. 3, still another point in the process at which the bauxite may be introduced, an intermediate stage of evaporation, is indicated. In this case, dilute black liquor from brownstock washers 18 is introduced into the first stage evaporator 220. Neither scaling nor viscosity increase are especially troublesome in this early stage of evaporation. The partially concentrated black liquor is directed by means of line 195 into reactor 221 where reaction occurs with the aluminum oxide of the bauxite introduced into reactor 221 through line 80. From the reactor, the reaction products are conveyed by line 196 to separator 222, in which the sodalite precipitate is separated from the black liquor and removed from the process stream through line 198. The black liquor is forwarded through line 197 to additional stages of evaporation 223 and, following evaporation, to the recovery furnace 26 through line 23.

While not illustrated in FIGS. 2 or 3, a final separation stage may be provided immediately before the recovery furnace 26 to remove sodalite which has precipitated, in delayed fashion, during the concentration of the black liquor.

Because bauxite is relatively inexpensive, the sodalite precipitate may be wasted rather than subjected to processing for recovery of reactant.

The bauxite addition via line 9', where the $Al_2O_3$ is dissolved from the bauxite before adding to the digester 11, is particularly designed for those cases in which the bauxite contains deleterious insolubles, such as very finely divided $Fe_2O_3$ which cannot be removed in the cleaning or bleaching steps. The reaction-dissolving station 91 is therefore followed in line 9' by the separator 92 in which $Fe_2O_3$ and/or other insoluble material is separated and removed through line 93. The clear white liquor containing the $Al_2O_3$ as $Na_2O.Al_2O_3$ proceeds from the separator 92 to the digester 11. In this case, removal of the sodalite from the pulp may not be necessary because discoloring and other impurities have been removed in separator 92.

For the purpose of illustrating the advantages of the invention to those skilled in the art, the following examples are given:

EXAMPLES—PROCEDURE

A depithed bagasse was obtained from a bagasse pulp mill. The bagasse contained 76.0% moisture, and the ash from ignition at 550° C. was 4.02% of the oven dried (O.D.) bagasse. 75.1% of the ash was $SiO_2$.

Tests were conducted in a 4 liter autoclave, in which 180 grams of bagasse (O.D. basis) was cooked with soda white liquor.

In all cooks, 750 grams of moist bagasse was treated with 306 ml of white liquor which contained 71.3 gpl of NaOH and 8.6 gpl of $Na_2CO_3$. 500 ml of water was added to the digester. The cooking cycle was 4 minutes to temperature and pressure (171° C., 110 psig), ten minutes cooking, and 6 minutes to cool to 100° C. The cooked pulp was then filtered and washed, and the black liquor and pulp were analyzed.

CONTROL SAMPLE

In this case, the silica-contaminated bagasse was cooked as described above to determine the amount of silica present in the dissolved solids of the black liquor. It was determined that the black liquor contained 6.85% total dissolved solids and of this total, silica made up 0.1707%, or 2.5% of the total dissolved solids. The 1350 grams of black liquor produced by cooking the bagasse contained 2.3 grams of soluble silica. This amount of silica in the black liquor is enough to cause serious scaling problems in the evaporation step, objectionable increase in the viscosity of the black liquor and substantial loss of lime in the recausticizing step.

EXAMPLE I

In a test simulating a process in which bauxite is added to white liquor (see line 90, FIG. 1), the white liquor is clarified to remove residual bauxite and then pumped to the digester to react with the soluble silica, 4.38 grams of hydrated sodium aluminate is dissolved in the white liquor. The white liquor contained 1.95 grams $Al_2O_3$, which is stoichiometrically equivalent to 2.29 grams $SiO_2$. Using the cooking cycle and washing previously described, the black liquor has 7.06% total dissolved solids, which included 0.011% $SiO_2$ and 0.063%

Al$_2$O$_3$. The treatment has been effective in that the silica has been reduced to 0.16% of the total dissolved solids from the value of 2.5% obtained in the control sample.

A slightly lower dose of Al$_2$O$_3$ is also effective. For example, using the stoichiometric proportion of 0.0243% Al$_2$O$_3$, the SiO$_2$ is 0.0286%.

PREPARATION OF SODIUM ALUMINATE LIQUOR FROM BAUXITE 1 liter of white liquor containing 110 gpl NaOH and 17 gpl Na$_2$CO$_3$ is agitated for 4 hours with 40 grams Indian bauxite analyzing 80.2% Al$_2$O$_3$. The resulting solution analyzes 23.0 gpl Al$_2$O$_3$.

EXAMPLE II

The precipitation of silica from black liquor with sodium aluminate prepared as described above is demonstrated.

0.5 liter of 20% solids black liquor (pH 12.3) containing 1.75 grams SiO$_2$ is agitated for 2 hours at 95° C. with sodium aluminate containing 1.34 grams Al$_2$O$_3$. The resulting clear liquor after filtration analyzes 0.25 gpl SiO$_2$ and 0.54 gpl Al$_2$O$_3$.

EXAMPLE III

Precipitation of silica from black liquor with sodium aluminate as in Example II is further demonstrated.

0.5 liter of 18.5% solids black liquor containing 3.2 grams SiO$_2$ is agitated with 100 ml of white liquor in which had been dissolved 2.3 gm Al$_2$O$_3$ by digestion with bauxite. After 2 hours at 95° C. a filtered sample analyzes 0.52 gpl SiO$_2$ and 0.13 gpl Al$_2$O$_3$.

It is apparent that a surplus of Al$_2$O$_3$ was added in Example II and too little in Example III, but the silica removal in Example III was still 90%.

The above examples conclusively demonstrate that desilication of silicon-contaminated pulp liquor can be achieved simply and economically by the addition of aluminum oxide in the form of hydrated aluminum oxide and, particularly, the naturally-occurring aluminum ore, bauxite.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for desilicating a silica-contaminated pulp liquor produced in the alkaline pulping process, said alkaline pulping process including the steps of digesting cellulosic fiber material with a sodium hydroxide-containing white liquor, separating the resulting black liquor from the pulp, concentrating the black liquor in multi-effect evaporators, combusting the concentrated black liquor to yield black ash, smelt or pellets and treating the black ash, smelt or pellets to recover sodium hydroxide in the form of white liquor which is recycled for the digestion step; the improvement comprising introducing bauxite ore into the black liquor to produce the intermediate compound sodium aluminate for reaction with the silica in the black liquor to form a sodalite precipitate, separating the sodalite precipitate and removing said precipitate from the process stream.

2. The process of claim 1 wherein the bauxite ore addition is made to the black liquor prior to the concentration step.

3. The process of claim 1 wherein the bauxite ore addition is made to the black liquor in an intermediate stage of evaporation.

4. The process according to claims 1, 2 or 3 wherein the bauxite ore addition contains aluminum oxide in the form of the trihydrate.

* * * * *

UNITED STATES PATENT AND TRADEMARK OFFICE
CERTIFICATE OF CORRECTION

PATENT NO. : 4,331,507
DATED : May 25, 1982
INVENTOR(S) : E. J. Roberts

It is certified that error appears in the above-identified patent and that said Letters Patent are hereby corrected as shown below:

On the title page,

In the Abstract, line 6 thereof, after "scaling" insert --during--.

Signed and Sealed this

Third Day of August 1982

[SEAL]

Attest:

*Attesting Officer*

GERALD J. MOSSINGHOFF
*Commissioner of Patents and Trademarks*